(12) United States Patent
Hoefelmeyer et al.

(10) Patent No.: US 6,385,204 B1
(45) Date of Patent: May 7, 2002

(54) NETWORK ARCHITECTURE AND CALL PROCESSING SYSTEM

(75) Inventors: Ralph Hoefelmeyer, Colorado Springs; Michael Hutchinson, Monument; Daniel O'Reilly, Colorado Springs, all of CO (US)

(73) Assignee: WorldCom, Inc., Washington, DC (US)

( * ) Notice: Subject to any disclaimer, the term of this patent is extended or adjusted under 35 U.S.C. 154(b) by 0 days.

(21) Appl. No.: 09/444,099

(22) Filed: Nov. 22, 1999

(51) Int. Cl.7 .............................................. H04L 12/28
(52) U.S. Cl. ...................................... 370/401; 370/402
(58) Field of Search ................................ 370/401, 405, 370/406, 402, 400, 395, 397, 399, 389, 230, 233, 235, 218, 285; 379/230

(56) References Cited

U.S. PATENT DOCUMENTS

| | | | |
|---|---|---|---|
| 6,091,708 A | * | 7/2000 | Matsunuma ................ 370/233 |
| 6,091,732 A | | 7/2000 | Alexander, Jr. et al. |
| 6,122,363 A | * | 9/2000 | Friedlander et al. ........ 379/230 |
| 6,137,874 A | * | 10/2000 | Brown et al. ................ 379/220 |
| 6,172,981 B1 | * | 1/2001 | Cox et al. ................... 370/401 |

* cited by examiner

Primary Examiner—Wellington Chin
Assistant Examiner—Brenda H. Pham

(57) ABSTRACT

A LAN/WAN network topology and design methodology using Internet Protocol (IP) subnet topology, ATM WAN configuration, equipment placement, and device configuration to provide partitioning of a call processing application across multiple sites. The partitioning reduces latency for mission critical messages, while providing for necessary provisioning traffic needs. Further, the overall topology provides the redundancy and resiliency necessary for mission critical call processing application, utilizing the IP subnets, ATM permanent virtual circuits, network device configuration, and server segregation to achieve Quality of Service (QoS).

26 Claims, 18 Drawing Sheets

Site_1 CS

| Interface Unique Names Required | Interface Purpose | Protocols on Interface | Address Space |
|---|---|---|---|
| Site_1ts01 | CS - TS communications | IP* | subnet 1 on CPFR |
| Site_1ts02 | CS - TS communications | IP* | subnet 1 on CPFR |
| Site_1ts03 | CS - TS communications | IP* | subnet 1 on CPFR |
| Site_1ts04 | CS - TS communications | IP* | subnet 1 on CPFR |
| Site_1rt0101 | Gateway router | IP | subnet 1 on CPFR |
| Site_1cs01 | Port on CS and hostname | IP* | subnet 1 on CPFR |
| Site_1cs02 | Port on CS and hostname | IP* | subnet 1 on CPFR |
| Site_1cs03 | Port on CS and hostname | IP* | subnet 1 on CPFR |
| Site_1cs04 | Port on CS and hostname | IP* | subnet 1 on CPFR |
| Site_1cs05 | Port on CS and hostname | IP* | subnet 1 on CPFR |
| Site_1cs06 | Port on CS and hostname | IP* | subnet 1 on CPFR |
| Site_1cs07 | Port on CS and hostname | IP* | subnet 1 on CPFR |
| Site_1cs08 | Port on CS and hostname | IP* | subnet 1 on CPFR |
| Site_1ad0103 | Alarm link to ADP | IP | subnet 3 |
| Site_1ad0203 | Alarm link to ADP | IP | subnet 3 |

FIG. 4(a)

Node: Site_1 TS

| Interface Unique Names Required | Interface Purpose | Protocols on Interface | Address Space |
|---|---|---|---|
| Site_1cs01 | CS - TS communications | IP* | subnet 1 on CPFR |
| Site_1cs02 | CS - TS communications | IP* | subnet 1 on CPFR |
| Site_1cs03 | CS - TS communications | IP* | subnet 1 on CPFR |
| Site_1cs04 | CS - TS communications | IP* | subnet 1 on CPFR |
| Site_1cs05 | CS - TS communications | IP* | subnet 1 on CPFR |
| Site_1cs06 | CS - TS communications | IP* | subnet 1 on CPFR |
| Site_1cs07 | CS - TS communications | IP* | subnet 1 on CPFR |
| Site_1cs08 | CS - TS communications | IP* | subnet 1 on CPFR |
| Site_1rt0101 | Gateway Router | IP | subnet 1 on CPFR |
| Site_1at0102 | TS - ATS | IP/RDP2 | subnet 2 on CPFR |
| Site_1at0202 | TS - ATS | IP/RDP2 | subnet 2 on CPFR |
| Site_1at0302 | TS - ATS | IP/RDP2 | subnet 2 on CPFR |
| Site_1at0402 | TS - ATS | IP/RDP2 | subnet 2 on CPFR |
| Site_1ss0103 | TS - SS | IP | subnet 3 on PFR |

FIG. 4(b) (1)

Node: Site_1 TS (Con't.)

| Interface Unique Names Required | Interface Purpose | Protocols on Interface | Address Space |
|---|---|---|---|
| Site_1ss0203 | TS - SS | IP | subnet 3 on PFR |
| Site_1ts01 | CS - TS communications | IP* | subnet 1 on CPFR |
| Site_1ts02 | CS - TS communications | IP* | subnet 1 on CPFR |
| Site_1ts03 | CS - TS communications | IP* | subnet 1 on CPFR |
| Site_1ts04 | CS - TS communications | IP* | subnet 1 on CPFR |
| Site_1ts0103 | Provisioning link | IP | subnet 3 on PFR |
| Site_1ts0203 | Provisioning link | IP | subnet 3 on PFR |
| Site_1ts0303 | Provisioning link | IP | subnet 3 on PFR |
| Site_1ts0403 | Provisioning link | IP | subnet 3 on PFR |
| Site_1ad0103 | Alarm link to ADP | IP | subnet 3 |
| Site_1ad0203 | Alarm link to ADP | IP | subnet 3 |
| Site_1ts0102 | TS - ATS | IP/RDP2 | subnet 2 on CPFR |
| Site_1ts0202 | TS - ATS | IP/RDP2 | subnet 2 on CPFR |
| Site_1ts0302 | TS - ATS | IP/RDP2 | subnet 2 on CPFR |
| Site_1ts0402 | TS - ATS | IP/RDP2 | subnet 2 on CPFR |

FIG. 4(b) (2)

Node: Site_1 ATS

| Interface Unique Names Required | Interface Purpose | Protocols on Interface | Address Space |
|---|---|---|---|
| Site_1rt0101 | Gateway router | IP | subnet 1 on CPFR |
| Site_1rt0102 | Gateway router | IP | subnet 2 on CPFR |
| Site_1at0102 | ATS - GDS & ATS - TS | IP/RDP2 | subnet 2 on CPFR |
| Site_1at0202 | ATS - GDS & ATS - TS | IP/RDP2 | subnet 2 on CPFR |
| Site_1at0302 | ATS - GDS & ATS - TS | IP/RDP2 | subnet 2 on CPFR |
| Site_1at0402 | ATS - GDS & ATS - TS | IP/RDP2 | subnet 2 on CPFR |
| Site_1ss0103 | Statistics link SS - ATS | IP | subnet 3 on PFR |
| Site_1ss0203 | Statistics link SS - ATS | IP | subnet 3 on PFR |
| Site_1at0103 | Provisioning port | IP | subnet 3 on PFR |
| Site_1at0203 | Provisioning port | IP | subnet 3 on PFR |
| Site_1at0303 | Provisioning port | IP | subnet 3 on PFR |
| Site_1at0403 | Provisioning port | IP | subnet 3 on PFR |
| Site_1gd0102 | ATS - GDS - local | IP/RDP2 | subnet 2 on CPFR |
| Site_1gd0202 | ATS - GDS - local | IP/RDP2 | subnet 2 on CPFR |
| Site_2gd0102 | ATS - GDS - remote | IP/RDP2 | subnet 2 on WAN |
| Site_2gd0202 | ATS - GDS - remote | IP/RDP2 | subnet 2 on WAN |
| Site_3gd0102 | ATS - GDS - remote | IP/RDP2 | subnet 2 on WAN |
| Site_3gd0202 | ATS - GDS - remote | IP/RDP2 | subnet 2 on WAN |
| Site_1bd0103 | Provisioning port | IP | subnet 3 on PFR |
| Site_1bd0203 | Provisioning port | IP | subnet 3 on PFR |
| Site_1ad0103 | Alarm link to ADP | IP | subnet 3 |
| Site_1ad0203 | Alarm link to ADP | IP | subnet 3 |

FIG. 4(c) (1)

Node: Site_1 GDS

| Interface Unique Names Required | Interface Purpose | Protocols on Interface | Address Space |
|---|---|---|---|
| Site_1rt0102 | Gateway router | IP/RDP2 | subnet 2 on CPFR |
| Site_1at0102 | ATS - GDS - local | IP/RDP2 | subnet 2 on CPFR |
| Site_1at0202 | ATS - GDS - local | IP/RDP2 | subnet 2 on CPFR |
| Site_1at0302 | ATS - GDS - local | IP/RDP2 | subnet 2 on CPFR |
| Site_1at0402 | ATS - GDS - local | IP/RDP2 | subnet 2 on CPFR |
| Site_1gd0102 | ATS - GDS - local | IP/RDP2 | subnet 2 on CPFR |
| Site_1gd0202 | ATS - GDS - local | IP/RDP2 | subnet 2 on CPFR |
| Site_2at0102 | ATS - GDS - remote | IP/RDP2 | subnet 2 on CPFR |
| Site_2at0202 | ATS - GDS - remote | IP/RDP2 | subnet 2 on CPFR |
| Site_2at0302 | ATS - GDS - remote | IP/RDP2 | subnet 2 on CPFR |
| Site_2at0402 | ATS - GDS - remote | IP/RDP2 | subnet 2 on CPFR |
| Site_3at0102 | ATS - GDS - remote | IP/RDP2 | subnet 2 on CPFR |
| Site_3at0202 | ATS - GDS - remote | IP/RDP2 | subnet 2 on CPFR |
| Site_3at0302 | ATS - GDS - remote | IP/RDP2 | subnet 2 on CPFR |
| Site_3at0402 | ATS - GDS - remote | IP/RDP2 | subnet 2 on CPFR |
| Site_3at0502 | ATS - GDS - remote | IP/RDP2 | subnet 2 on CPFR |
| Site_3at0602 | ATS - GDS - remote | IP/RDP2 | subnet 2 on CPFR |
| Site_1ad0103 | Alarm link to ADP | IP | subnet 3 |
| Site_1ad0203 | Alarm link to ADP | IP | subnet 3 |

FIG. 4(d)

Node: Leeds OCS

| Interface Unique Names Required | Interface Purpose | Protocols on Interface | Address Space |
|---|---|---|---|
| Site_1rt0103 | Gateway router | IP | subnet 3 on PFR |
| Site_1ts01 | Hostname | n/a | n/a |
| Site_1ts02 | Hostname | n/a | n/a |
| Site_1ts03 | Hostname | n/a | n/a |
| Site_1ts04 | Hostname | n/a | n/a |
| Site_1ad0103 | Alarm link to ADP | IP | subnet 3 |
| Site_1ad0203 | Alarm link to ADP | IP | subnet 3 |
| Site_1oc0103 | hostname & PFR interface | IP | subnet 3 |
| Site_1oc0203 | hostname & PFR interface | IP | subnet 3 |

FIG. 4(e)

Node: Site_1 SS

| Interface Unique Names Required | Interface Purpose | Protocols on Interface | Address Space |
|---|---|---|---|
| Site_1rt0103 | Gateway router | IP | subnet 3 on PFR |
| Site_1ss0103 | Statistics broadsite_3st link | IP | subnet 3 on PFR |
| Site_1ss0203 | Statistics broadsite_3st link | IP | subnet 3 on PFR |
| Site_1ss0104 | SS - RS link | IP | subnet 4 on PFR |
| Site_1ss0204 | SS - RS link | IP | subnet 4 on PFR |
| Site_1ts0103 | TS - SS | IP | subnet 3 on PFR |
| Site_1ts0203 | TS - SS | IP | subnet 3 on PFR |
| Site_1ts0303 | TS - SS | IP | subnet 3 on PFR |
| Site_1ts0403 | TS - SS | IP | subnet 3 on PFR |
| Site_1ad0103 | Alarm link to ADP | IP | subnet 3 |
| Site_1ad0203 | Alarm link to ADP | IP | subnet 3 |
| Site_1at0103 | ATS - SS | IP | subnet 3 on PFR |
| Site_1at0203 | ATS - SS | IP | subnet 3 on PFR |
| Site_1at0303 | ATS - SS | IP | subnet 3 on PFR |
| Site_1at0403 | ATS - SS | IP | subnet 3 on PFR |
| Site_1rs0104 | SS - RS link - remote RS | IP | subnet 4 on PFR |
| Site_2rs0104 | SS - RS link - remote RS | IP | subnet 4 on PFR |

FIG. 4(f)

Node: Site_1 RS

| Interface Unique Names Required | Interface Purpose | Protocols on Interface | Address Space |
|---|---|---|---|
| Site_1rt0103 | Gateway router | IP | subnet 3 on PFR |
| Site_1ad0103 | Alarm link to ADP | IP | subnet 3 |
| Site_1ad0203 | Alarm link to ADP | IP | subnet 3 |
| Site_1ss0104 | SS - RS link | IP | subnet 4 on PFR |
| Site_1ss0204 | SS - RS link | IP | subnet 4 on PFR |
| Site_2ss0104 | SS - RS link | IP | subnet 4 on PFR |
| Site_2ss0204 | SS - RS link | IP | subnet 4 on PFR |
| Site_3ss0104 | SS - RS link | IP | subnet 4 on PFR |
| Site_3ss0204 | SS - RS link | IP | subnet 4 on PFR |
| Site_1rs0104 | SS - RS link | IP | subnet 3 on PFR |
| Site_2rs0104 | SS - RS link | IP | subnet 3 on PFR |

FIG. 4(g)

Node: Site_1 BEDS

| Interface Unique Names Required | Interface Purpose | Protocols on Interface | Address Space |
|---|---|---|---|
| Site_1rt0103 | Gateway router | IP | subnet 3 on CPFR |
| Site_1ts0103 | Provisioning port | IP | subnet 3 on PFR |
| Site_1ts0203 | Provisioning port | IP | subnet 3 on PFR |
| Site_1ts0303 | Provisioning port | IP | subnet 3 on PFR |
| Site_1ts0403 | Provisioning port | IP | subnet 3 on PFR |
| Site_1at0103 | Provisioning port | IP | subnet 3 on PFR |
| Site_1at0203 | Provisioning port | IP | subnet 3 on PFR |
| Site_1at0303 | Provisioning port | IP | subnet 3 on PFR |
| Site_1at0403 | Provisioning port | IP | subnet 3 on PFR |
| Site_1bd0103 | Provisioning port | IP | subnet 3 on PFR |
| Site_1bd0203 | Provisioning port | IP | subnet 3 on PFR |
| Site_2fd0103 | Provisioning port | IP | subnet 3 on PFR |
| Site_3fd0103 | Provisioning port | IP | subnet 3 on PFR |
| Site_1ad0103 | Alarm link to ADP | IP | subnet 3 |
| Site_1ad0203 | Alarm link to ADP | IP | subnet 3 |

FIG. 4(h)

Node: Site_2 FEDS

| Interface Unique Names Required | Interface Purpose | Protocols on Interface | Address Space |
|---|---|---|---|
| Site_2rt0103 | Gateway router | IP | subnet 3 on CPFR |
| Site_1bd0103 | Provisioning port | IP | subnet 3 on PFR |
| Site_1bd0203 | Provisioning port | IP | subnet 3 on PFR |
| Site_2bd0103 | Provisioning port | IP | subnet 3 on PFR |
| Site_2bd0203 | Provisioning port | IP | subnet 3 on PFR |
| Site_3bd0103 | Provisioning port | IP | subnet 3 on PFR |
| Site_3bd0203 | Provisioning port | IP | subnet 3 on PFR |
| Site_2fd0103 | Provisioning port | IP | subnet 3 on PFR |
| Site_3fd0103 | Provisioning port | IP | subnet 3 on PFR |
| Site_2ad0103 | Alarm link to ADP | IP | subnet 3 |
| Site_2ad0203 | Alarm link to ADP | IP | subnet 3 |

FIG. 4(i)

Node: Site_1 ACP

| Interface Unique Names Required | Interface Purpose | Protocols on Interface | Address Space |
|---|---|---|---|
| Site_1rt0103 | Gateway router | IP | subnet 3 on CPFR |
| Site_1ad0103 | Alarm link to ADP | IP | subnet 3 |
| Site_1ad0203 | Alarm link to ADP | IP | subnet 3 |
| Site_1ac0103 | ACP interface | IP | subnet 3 |
| Site_1ac0203 | ACP interface | IP | subnet 3 |

FIG. 4(j)

Node: Site_1 ADP

| Interface Unique Names Required | Interface Purpose | Protocols on Interface | Address Space |
|---|---|---|---|
| Site_1ts01 | Hostname & interface | IP* | subnet 1 on CPFR |
| Site_1ts02 | Hostname & interface | IP* | subnet 1 on CPFR |
| Site_1ts03 | Hostname & interface | IP* | subnet 1 on CPFR |
| Site_1ts04 | Hostname & interface | IP* | subnet 1 on CPFR |
| Site_1cs01 | Port on CS and hostname | IP* | subnet 1 on CPFR |
| Site_1cs02 | Port on CS and hostname | IP* | subnet 1 on CPFR |
| Site_1cs03 | Port on CS and hostname | IP* | subnet 1 on CPFR |
| Site_1cs04 | Port on CS and hostname | IP* | subnet 1 on CPFR |
| Site_1cs05 | Port on CS and hostname | IP* | subnet 1 on CPFR |
| Site_1cs06 | Port on CS and hostname | IP* | subnet 1 on CPFR |
| Site_1rt0101 | Gateway router | IP | subnet 1 on CPFR |
| Site_1rt0102 | Gateway router | IP | subnet 2 on CPFR |
| Site_1rt0103 | Gateway router | IP | subnet 3 on PFR |
| Site_1at0102 | ATS - GDS | IP/RDP2 | subnet 2 on CPFR |
| Site_1at0202 | ATS - GDS | IP/RDP2 | subnet 2 on CPFR |
| Site_1at0302 | ATS - GDS | IP/RDP2 | subnet 2 on CPFR |
| Site_1at0402 | ATS - GDS | IP/RDP2 | subnet 2 on CPFR |
| Site_1ss0103 | Statistics broadcast link | IP | subnet 3 on PFR |

FIG. 4(k) (1)

Node: Site_1 ADP (Con't.)

| Interface Unique Names Required | Interface Purpose | Protocols on Interface | Address Space |
|---|---|---|---|
| Site_1ss0203 | Statistics broadcast link | IP | subnet 3 on PFR |
| Site_1ss0104 | SS - RS link | IP | subnet 4 on PFR |
| Site_1ss0204 | SS - RS link | IP | subnet 4 on PFR |
| Site_1at0103 | ATS - SS | IP | subnet 3 on PFR |
| Site_1at0203 | ATS - SS | IP | subnet 3 on PFR |
| Site_1at0303 | ATS - SS | IP | subnet 3 on PFR |
| Site_1at0403 | ATS - SS | IP | subnet 3 on PFR |
| Site_1gd0102 | ATS - GDS - local | IP/RDP2 | subnet 2 on CPFR |
| Site_1gd0202 | ATS - GDS - local | IP/RDP2 | subnet 2 on CPFR |
| Site_1oc0103 | hostname | IP | subnet 3 |
| Site_1oc0203 | hostname | IP | subnet 3 |
| Site_1rs0104 | SS - RS link | IP | subnet 4 on PFR |
| Site_1ac0103 | ACP port | IP | subnet 3 |
| Site_1ac0203 | ACP port | IP | subnet 3 |
| Site_1os0103 | HP OpenView server interface | IP | subnet 3 |
| Site_1os0203 | HP OpenView server interface | IP | subnet 3 |
| Site_1no0103 | Onsite NIP Mgr interface | IP | subnet 3 |
| nonr0103 | ASNOU NIP Mgr interface | IP | subnet 3 |
| conr0103 | COU NIP Mgr interface | IP | subnet 3 |
| 31nr0103 | DSU NIP Mgr interface | IP | subnet 3 |
| Site_1bd0103 | Provisioning port | IP | subnet 3 on PFR |
| Site_1bd0203 | Provisioning port | IP | subnet 3 on PFR |
| Site_1ad0103 | Alarm link to ADP | IP | subnet 3 |
| Site_1ad0203 | Alarm link to ADP | IP | subnet 3 |

FIG. 4(k) (2)

Node: Site_1 OVW

| Interface Unique Names Required | Interface Purpose | Protocols on Interface | Address Space |
|---|---|---|---|
| Site_1rt0101 | Gateway router (7513 FDDI) | IP/HSRP | subnet 1 on CPFR |
| Site_1rt0102 | Gateway router (7513 FDDI) | IP/HSRP | subnet 2 on CPFR |
| Site_1rt0103 | Gateway router (7513 FDDI) | IP | subnet 3 on PFR |
| Site_1os0103 | HP OpenView server interface | IP | subnet 3 |
| Site_1os0203 | HP OpenView server interface | IP | subnet 3 |
| Site_1rt0303 | Gateway router (7507 FDDI) | IP | subnet 3 |
| Site_1fh0101 | GeoLAN management port | IP | subnet 1 |
| Site_1fh0201 | GeoLAN management port | IP | subnet 1 |
| Site_1fh0303 | GeoLAN management port | IP | subnet 3 |
| Site_1fh0403 | GeoLAN management port | IP | subnet 3 |
| Site_1gs0103 | GIGAswitch management port | IP | subnet 3 |
| Site_1gs0203 | GIGAswitch management port | IP | subnet 3 |

FIG. 4(I)

NETWORK ARCHITECTURE AND CALL PROCESSING SYSTEM

FIELD OF THE INVENTION

The present invention relates generally to call processing network design architectures, and particularly, to an IP based network LAN/WAN design implementing Internet Protocol (IP) subnet topology, Asynchronous Transfer Mode (ATM) WAN configuration, and network device configuration for partitioning a call processing application across multiple LAN sites.

BACKGROUND OF THE INVENTION

There exist many types of networks and shared information communications systems. From a hierarchical standpoint, network topologies typically comprise a plurality of local area networks (LANs), such as Ethernet, which, depending upon the amount of users, location and amount of traffic, may be further interconnected locally with a high-speed backbone network, such as backbone fiber distributed data interface (FDDI), and asynchronous transfer mode (ATM) backbone networks. Multiple LANs owned by a single entity and geographically dispersed, may be interconnected via wide area networks (WANs) for long distance information transport. Such WAN transport technologies may include dial-up private networks, switched digital services, leased-lines, packet-switching and frame-relay services, cell relay, and public packet-switched network such as the Internet. It is understood that each type of network is capable of carrying different types of information: data, voice, multimedia including audio and video data. As known, ATM networks in particular, are connection oriented and capable of achieving certain quality of service (QoS) guarantees so that data, e.g., video, is transported across networks to their destinations in a timely manner. Other QoS guarantees include bandwidth control, prioritization of selected traffic, and traffic security.

In the telecommunications industry, there exist many types of call processing networks and network topologies for carrying prevalent types of traffic such as real-time call processing traffic, e.g., for toll-free number calls, and ATM provisioning traffic, e.g., for other types of prioritized traffic. Each of these traffic types have differing latency and processing requirements. In order to meet these differing requirements, it is advantageous to provide an overall network topology that is physically and logically partitioned to enable traffic segregation within a LAN and WAN, as desired, such that specific traffic types may be segregated to specific interfaces on network devices, and that specific traffic types may be delivered in the most mission efficient manner.

It would thus be highly desirable to provide a call processing network architecture that includes an IP based network LAN/WAN design implementing Internet Protocol (IP) subnet topology that may be configured to provide redundancy, reduce latency for mission critical call processing messages, and provide for all necessary traffic provisioning needs.

SUMMARY OF THE INVENTION

The present invention is directed to a call processing and provisioning network topology that makes use of subnets, so that traffic may be segregated within a LAN/WAN as desired and allowing for the assignment of specific traffic types to specific interfaces on network devices, e.g., allowing traffic to be directed to specific permanent virtual circuits (PVCs) in an ATM WAN. Each PVC is to be further configured using priority rate queuing enabling delivery of specific traffic types in the most mission efficient manner. The call processing network architecture of the invention particularly employs an IP based network LAN/WAN design implementing Internet Protocol (IP) subnet topology that is configured to provide redundancy, reduce latency for mission critical call processing messages, and provide for all necessary traffic provisioning needs.

According to the principles of the invention, there is provided a system and method for implementing a call processing application across a plurality of local area network (LAN) sites interconnected via a wide area network (WAN), with each LAN site comprising: (a) first high-speed network including and one or more interconnected network elements for handling call processing traffic, each the network element of the first network having an associated internet protocol IP address; (b) second high-speed network including one or more interconnected network elements for handling call provisioning traffic, each the network element of the second network having an associated internet protocol IP address, the associated IP addresses of the first and second high-speed networks being logically segregated into one or more subnets for handling call traffic according to traffic latency requirements; and, (c) a router device configured to interface with each the first and second high-speed networks at a site via the one or more subnets and enable traversal of call processing and provisioning traffic over the WAN destined from one LAN site to another of the LAN sites, whereby network traffic latencies are minimized by routing different network traffic types via the one or more subnets.

Advantageously, the invention provides maximum redundancy as redundancy is critical to the operational utility of the NIP, and minimal recovery times, with single points of failure being virtually eliminated.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

BRIEF DESCRIPTION OF DRAWINGS

FIG. 4(a) illustrates the mapping and description of unique interfaces assigned to the CS network device of a site with corresponding assigned subnets.

FIGS. 4(b)(1) and 4(b)(2) illustrate the mapping and description of unique interfaces assigned to the TS network device of a site with corresponding assigned subnets.

FIGS. 4(c)(1) and 4(c)(2) illustrate the mapping and description of unique interfaces assigned to the ATS network device of a site with corresponding assigned subnets.

FIG. 4(d) illustrates the mapping and description of unique interfaces assigned to the GDS network device of a site with corresponding assigned subnets.

FIG. 4(e) illustrates the mapping and description of unique interfaces assigned to the OCS network device of a site with corresponding assigned subnets.

FIG. 4(f) illustrates the mapping and description of unique interfaces assigned to the SS network device of a site with corresponding assigned subnets.

FIG. 4(g) illustrates the mapping and description of unique interfaces assigned to the RS network device of a site with corresponding assigned subnets.

FIG. 4(h) illustrates the mapping and description of unique interfaces assigned to the BEDS network device of a site with corresponding assigned subnets.

FIG. 4(i) illustrates the mapping and description of unique interfaces assigned to the FEDS network device of a site with corresponding assigned subnets.

FIG. 4(j) illustrates the mapping and description of unique interfaces assigned to the ACP network device of a site with corresponding assigned subnets.

FIGS. 4(k)(1) and 4(k)(2) illustrate the mapping and description of unique interfaces assigned to the ADP network device of a site with corresponding assigned subnets.

FIG. 4(l) illustrates the mapping and description of unique interfaces assigned to the OVW network device of a site with corresponding assigned subnets.

DETAILED DESCRIPTION OF THE PREFERRED EMBODIMENT

Figure 1:
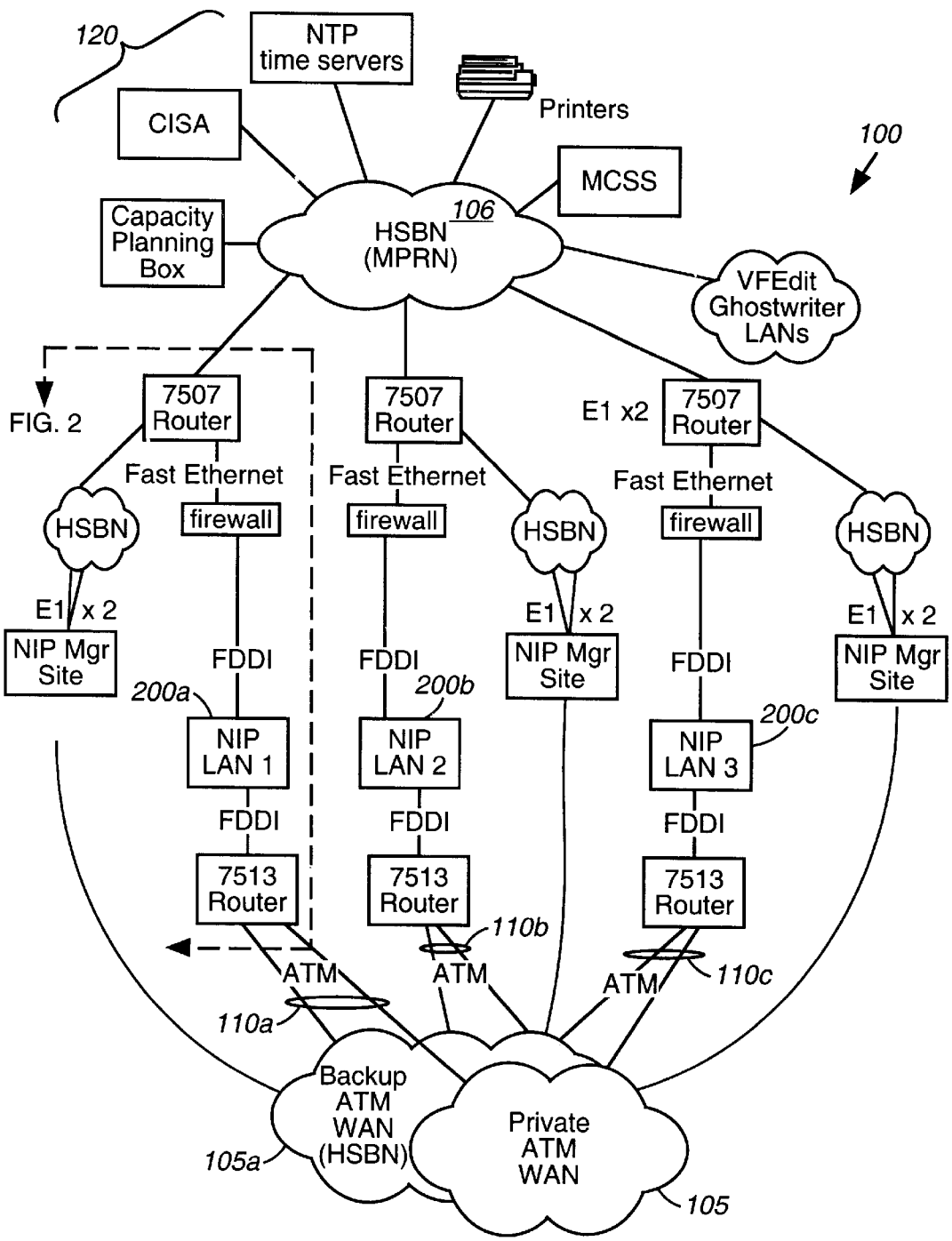
FIG. 1 illustrates the NIP LAN/WAN architecture of the invention.

As shown in FIG. 1, the Network Intelligent Peripheral (NIP) topology 100 of the invention includes a private ATM backbone WAN 105 and/or backup ATM WAN 105a comprising one or more BPX ATM switches for linking three or more distinct LAN network sites 200a–200c. The ATM WAN 105/back-up ATM WAN 105a implements private point-to-point ATM links depicted in FIG. 1 as links 110a–110c between the respective NIP LAN sites 200a–200c, respectively. The Hot Standby Network (HSBN) 106 is implemented as a backup network, for connectivity to the Monitoring Command System (MCSS) 115 as well as other System/Network management sites 120. As will be hereinafter described in greater detail, each NIP LAN site 200a–200c comprises: a real-time call processing LAN, a provisioning LAN, and the Intelligent Peripheral LAN. As will be described, with the NIP network topology 100 depicted in FIG. 1, network latencies are minimized to meet the Statement of Necessary Requirements (SONR) for real-time traffic, in particular that traffic which must traverse the WAN.

Figure 2:
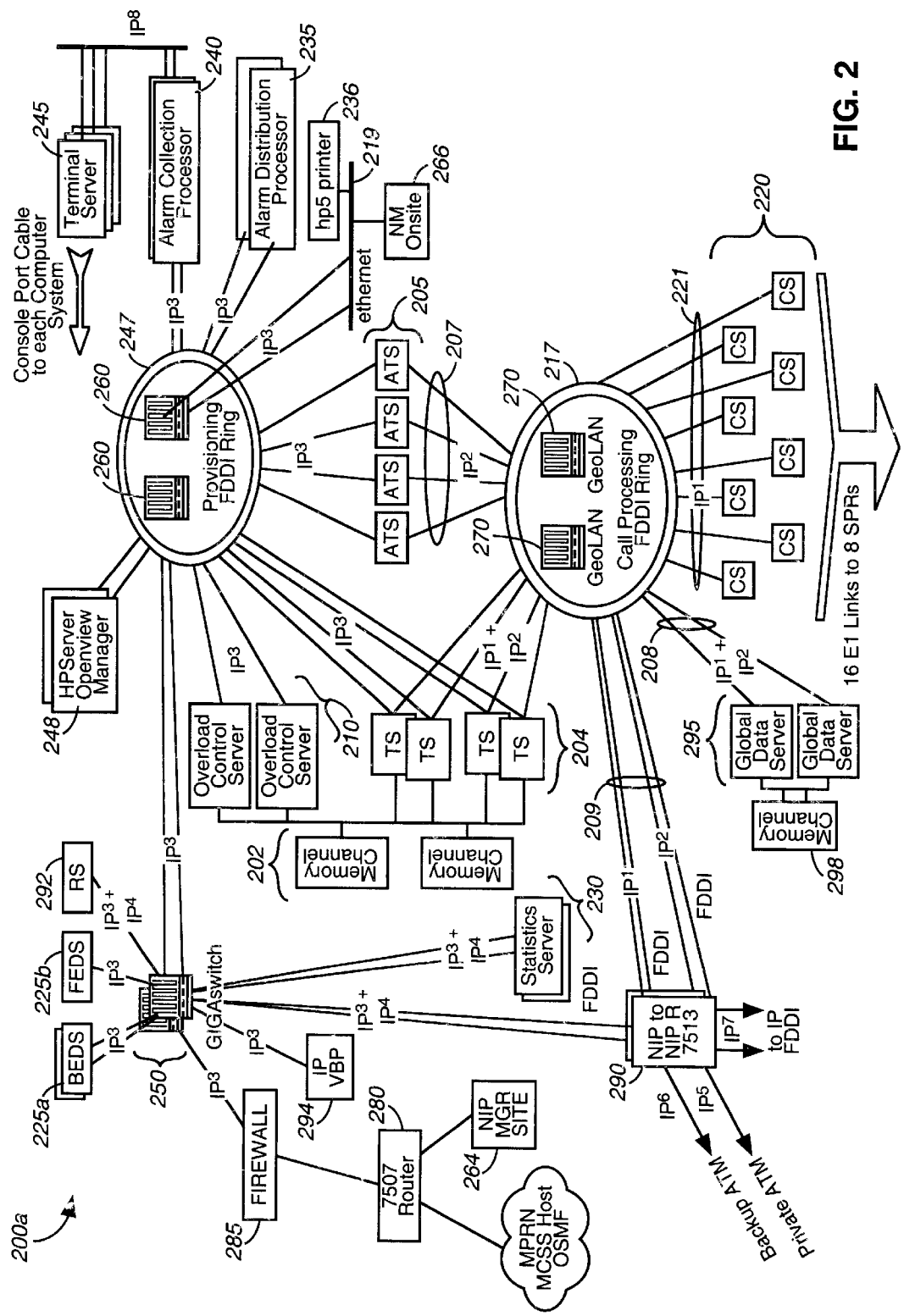
FIG. 2 illustrates the primary functional components of each of the production LANs depicted in FIG. 1.

Although the LAN configuration of the different sites may vary, FIG. 2 illustrates the general configuration of each network intelligent peripheral (NIP) LAN site, e.g., LAN site 200a. As shown in FIG. 2, the LAN site 200a includes a real-time call processing LAN, such as implemented by a Call Processing FDDI Ring (CPFR) 217, and a provisioning LAN, such as implemented by a Provisioning FDDI Ring (PFR) 247. As will be explained herein in greater detail, the PFR 247 is physically split between two or more provisioning GeoLAN hubs 260 and two or more provisioning LAN GIGAswitches 250 with the GeoLAN hubs comprising traditional FDDI ring technology, while the GIGAswitches 250 are non-blocking, cross-bar switched and exploited for their higher bandwidth (as compared to the standard FDDI implementation). The FDDI ports on both the CPFR and the PFR are dual homed such that the "AA" port of a given FDDI port is connected to one hub of a given ring, while the "B" port is connected to the other hub of that ring 247. This configuration ensures that the loss of any given hub does not bring down the ring. Additionally, each LAN site may include the following systems:

1) two or more communication servers 220 (CS) for providing simultaneous communications services, e.g., transfer files, access information on systems or networks, for one or more users on the network, and which may comprise a DEC Alpha Server 4100 having a digital UNIX operating system, and, interfaced with mass storage devices (not shown) and the call processing FDDI 217;

2) two or more Memory Channel Hubs (TS/OCS) 202 which include CCMAA cards for interfacing with a bus and enabling direct memory data transfer between systems;

3) two or more transaction servers (TS) 204 for brokering call requests for call routing information and sending the information back to the CS, and which may comprise a DEC Alpha Server 4100 having a digital UNIX operating system, and, interface with mass storage devices (not shown), the call processing FDDI 217, the provisioning FDDI ring 247, and memory channel hubs via CCMAA memory channel cards (not shown). Preferably, each TS 201 has three FDDI ports (fta0, fta1 & fta2) and each ATS 205 has two FDDI ports (fta0 and fta1). Assuming fta0 (and fta1 for the TS) is connected to the CPFR 217 and fta1 (fta2 for the TS) are connected to the PFR 247 for each server. This port split allows all real-time traffic to be prioritized by the server out to the real-time ring, while provisioning traffic is directed to the provisioning ring. Thus, different traffic types are segregated physically as well as logically, placing real-time bandwidth demands where appropriate. The multiple interfaces for the TS 204 on the same FDDI ring are due to Digital UNIX inability to handle multiple subnets on the same physical interface;

4) two or more Advanced Transaction Servers (ATS) 205 which performs as the TS, however, provides more complicated services;

5) two or more global data servers (GDS) 295 which provide call routing information to the TS & ATS and, which may additionally provide call routing information across the WAN to other sites. These servers may comprise a DEC Alpha Server 4100 having a digital UNIX operating system, and, interfaced with mass storage devices (not shown), the call processing FDDI 217, and an associated memory channel hub 298 via CCMAA memory channel cards (not shown);

6) two or more Overload Control Servers 210 which provide a busy signal for calls as the application approaches overload of it's call capacity. These servers may comprise a DEC Alpha Server 4100 having a digital UNIX operating system, and, interface with mass storage devices (not shown), the call provisioning FDDI ring 247, and memory channel via CCMAA memory channel cards (not shown);

7) two or more Back End Data Servers (BEDS) 225*a* for back ups and provisioning data, and two or more Front End Data Servers (FEDS) 225*b* for back ups and provisioning data. Each of these systems may comprise a DEC Alpha Server 4100 having a digital UNIX operating system, interface with mass storage devices (not shown), and interface with the provisioning LAN Gigaswitches 250;

8) two or more Statistics Servers (SS) 230 which gather call statistics from the TS & ATS servers and which may comprise a DEC Alpha Server 4100 having a digital UNIX operating system, interface with mass storage devices (not shown), and interface with the provisioning LAN GIGAswitches 250;

9) two or more Alarm Collection Processors (ACP) 240 which gather the application alarms from throughout the application space and which may comprise a DEC Alpha Server 1200 having a digital UNIX operating system, interface with mass storage devices (not shown), and interface with the provisioning FDDI ring;

10) two or more Alarm Distribution Processors (ADP) 235 which take the gathered alarms and displays them to various operational personnel and, which may comprise a DEC Alpha 4100 Server having a digital UNIX operating system, interface with mass storage devices (not shown), and interface with the provisioning FDDI ring;

11) two or more Terminal Servers 245 which provide a plurality of ports available for system console port connectivity and may comprise a DECServer 700;

12) an NIP Manager 264 which may comprise a DEC Alpha 4120 Server having a Digital UNIX operating system, and provided with systems for interfacing with mass storage devices (not shown);

13) an NIP Manager Onsite 266 which may comprise a DEC Personal workstation having a digital UNIX operating system, and associated displays and systems for interfacing with mass storage devices (not shown) and the Ethernet LAN 219;

14) two or more Openview Servers 248 such as provided by Hewlett Packard (HP) which provide network management system functionality;

15) two or more sets of GeoLAN Hubs 270 which provide for the configuration and monitoring of the GeoLAN Call Processing FDDI hubs 217;

16) one or more routers 280 such as router models 7507 manufactured by Cisco Systems, Inc. for routing packets to the HSBN MPRN (MCSS Host) from the LAN site, e.g., site 200*a*;

17) a firewall 285 providing secure interface between the router 280 and the GIGAswitch 250 of the LAN site;

18) two routers 290 such as router models 7513 Routers manufactured by Cisco Systems, Inc. which provide an interface to the private ATM backbone WAN 105 and/or backup ATM WAN 105*a*. Preferably, permanent virtual circuits (PVCs) are provisioned from the router 285 to BPX switches (not shown) in the ATM backbone which use the full Mbps bandwidth of the link to the BPX switch. However, no traffic shaping is done in the router—rather, the BPX switches shape the traffic over the PVCs as will be hereinafter described in greater detail. The Cisco 7513 routers' FDDI interfaces utilize the Hot Standby Routing Protocol (HSRP) available from Cisco System Inc. and described in a product bulletin available from Cisco Systems, the contents and disclosure of which is hereby incorporated by reference, to provide for failover to the standby router in case of a LAN port failure, either on the router or on a hub. This protocol goes into effect when the LAN connection is lost, and fails the mission traffic flow over to the standby router. Use of HSRP is necessitated by the slow recovery times of RIP or Interior Gateway Routing Protocol (IGRP), relative to NIP mission requirements. Moreover, the Cisco 7513 routers utilize the Enhanced Interior Gateway Routing Protocol (EIGRP) on the ATM OC-3 interfaces to the BPX switches to provide for failover routing in the event of interface or link loss to the switches. The failure of one inter BPX link out of the two causes the switch to route all traffic over the remaining link, using the minimum specified bit rates for each PVC. Loss of all inter BPX links on one site to site path switch forces EIGRP protocol to route data via the other switch at the site. Referring back to FIG. 1, if all site to site pathways for all switches at a site are lost, the traffic is routed over the HSBN WAN depicted as WAN cloud 106. This option requires the total isolation of the site's private WAN links, i.e., the severing of three E-3 links. Preferably, Available Bit Rate (ABR) guarantees that the real-time ATS-GDS link is the first recovered, i.e., the ATS-GDS link (PVCs) is apportioned whatever bandwidth there is, so in the context of a recovering set of links on a switch, this link comes back first. Note this only applies to ATS-GDS links (PVCs)to be established across the WAN between sites, not the Call Processing LAN 217 at a site.

Other types of equipment that may be included at a LAN site include a network printer 236 connected with Ethernet LAN 219; a report server 292 for gathering statistical data from statistics servers on call services information; and, an IP voice provisioning box (VPB) 294.

According to the invention, as mentioned, the suite of servers in each given ring (CPFR 217 & PFR 247) are each dual homed; further, half of the servers of a given contingent (e.g., the CSs) are connected to one card in the given hub, while the other half is connected to another card in the hub. Thus, network architecture is enabled to maintain a mission capability, albeit degraded, in case a given card in the two hubs has failed. To support this configuration, the architecture employs a Spanning Tree Protocol (STP) (proprietary to Cisco Systems, Inc.) which must be turned off to prevent failover times in excess of 45 seconds. With STP off, failover times are less than three seconds. Additionally, with STP off, the LAN topology must avoid loops involving the GIGAswitches, lest a network loop be created.

Messages destined for the CPFR 217 are typically real-time, high-priority data flows dealing with call processing, with minimal management traffic. As further shown in the NIP LAN site 200*a* of FIG. 2, these call processing messages flow via lines 221 into the CPFR 217 particularly from a CS 220 from the Call Transmission Network (CTN) network. Additional traffic into the CPFR include messages from a remote ATS 205 over lines 207, destined for the GDS 295. Other types of traffic may be routed from the Cisco 7513 router 290 into the CPFR 217 via line 209. Outgoing message flows from the CPFR 217 are primarily from the CS to the CTN network, and, from the ATS to a remote GDS via lines 208.

Figure 3A:
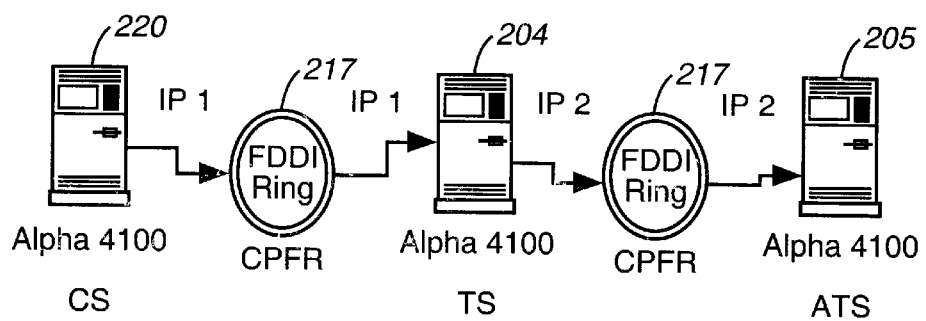
FIG. 3(a) depicts an example LAN call flow scenario between a communications server and an advanced transaction server in the LAN/WAN design of the invention.
Figure 3B:
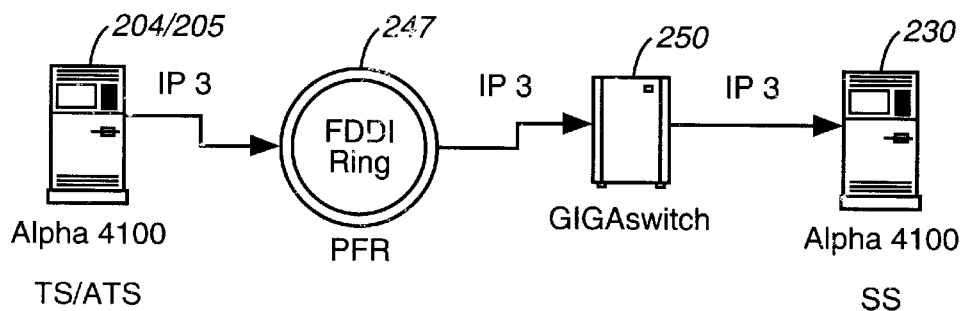
FIG. 3(b) depicts an example LAN call flow scenario between a transaction/advanced transaction server and a statistics server (multicast) in the LAN/WAN design of the invention.
Figure 3C:
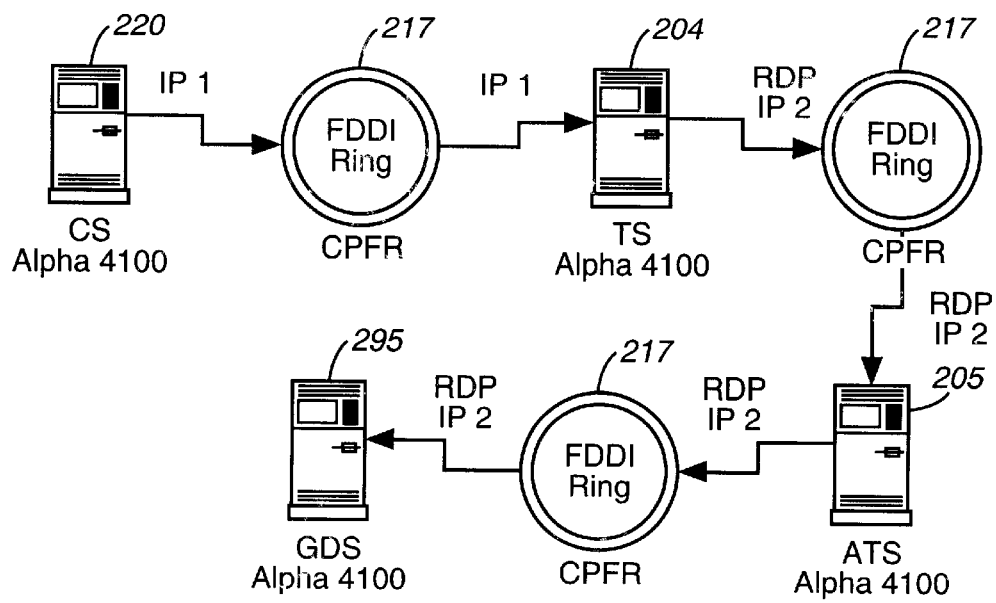
FIG. 3(c) depicts an example LAN call flow scenario between a communications server and a local global data server in the LAN/WAN design of the invention.
Figure 3D:
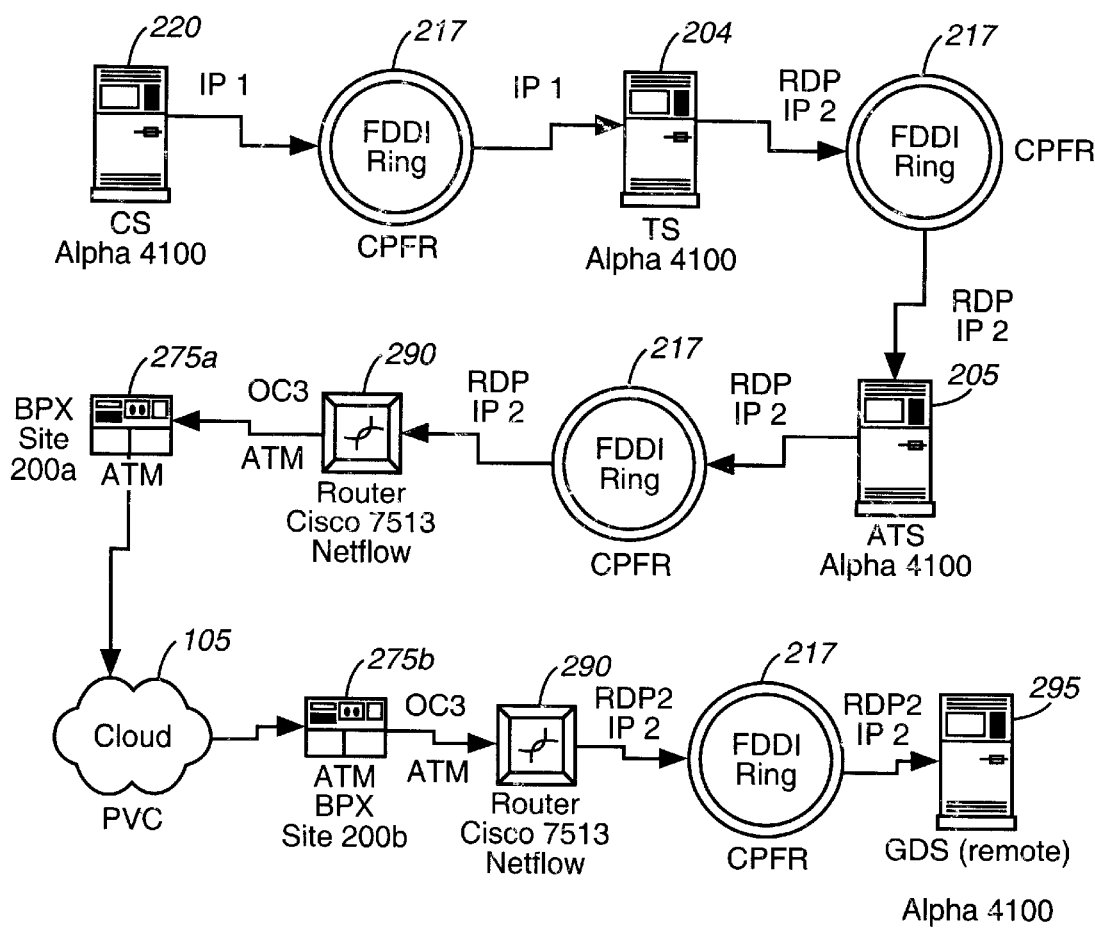
FIG. 3(d) depicts an example LAN call flow scenario between a communications server and a remote global data server in the LAN/WAN design of the invention.
Figure 3E:
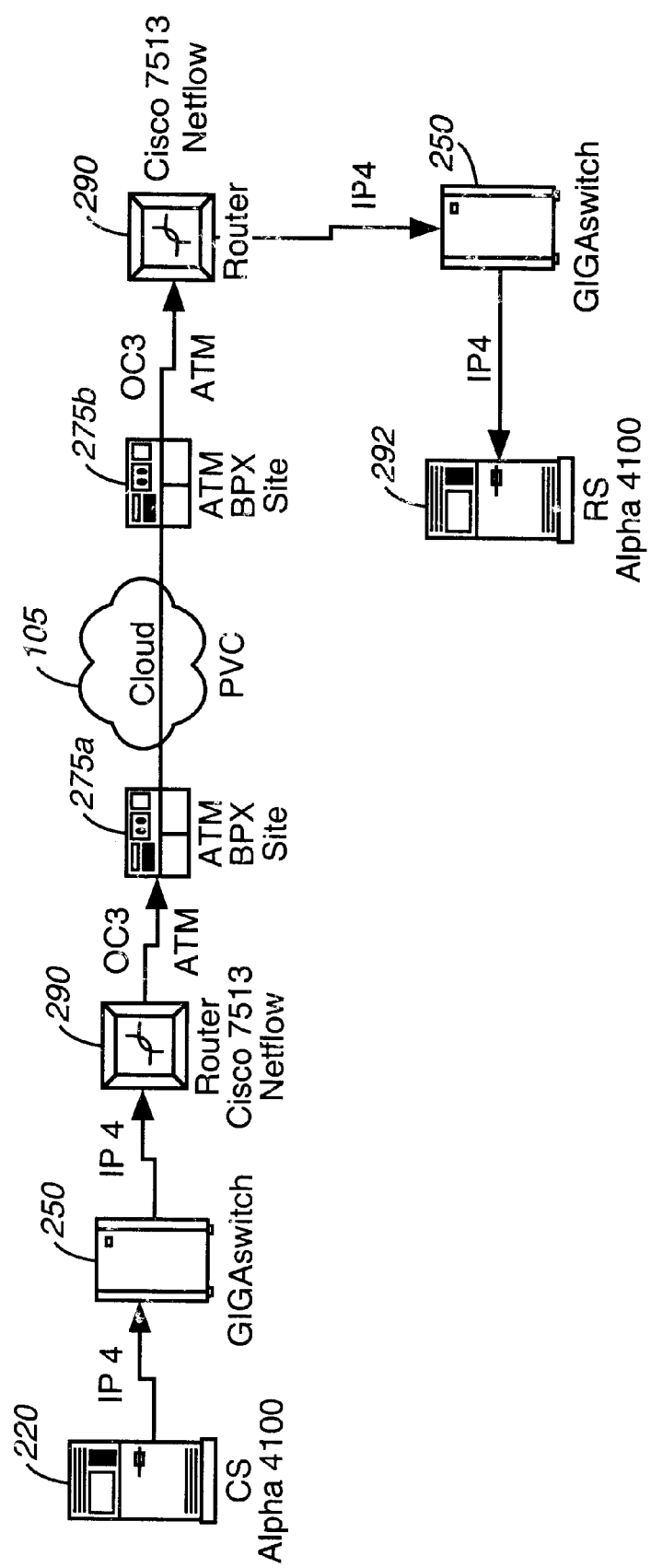
FIG. 3(e) depicts an example LAN call flow scenario between a statistics server and a report server in the LAN/WAN design of the invention.

Example message flows to be routed within the CPFR 217 include, but are not limited to, the following: messages from the CS 220 to the TS 204 (and reverse) and messages routed from the TS 204 to an ATS 205 via the CPFR 217 as depicted in FIG. 3(a); messages (multicast) between a transaction/advanced transaction server 204/205 and the SS 230 via the PFR 247 and the GIGAswitch 250 as depicted in FIG. 3(b); messages between a CS 220 and a local GDS 295 at the same site by way of the TS 204, the ATS 205, and the CPFR 217 (and reverse) as depicted in FIG. 3(c); messages between a CS 220 and a GDS 295 at a remote site by way of the TS 204, the ATS 205, the CPFR 217 to the router 290 and from the router via an OC3 connection to a first ATM BPX switch 275a associated with NIP LAN site, e.g., site 200a, and through a PVC pipe (represented by ATM cloud 105) to a second ATM BPX switch 275b associated with remote NIP LAN site, e.g., site 200b, to a router 290 at the remote site via an OC3 connection and finally to the remote GDS 295 through CPFR 217 at the remote site as depicted in FIG. 3(d); and, messages between a SS 220 and a RS 292 at a remote site by way of the GIGAswitch 250 to the router 290 and from the router via an OC3 connection to a first ATM BPX switch 275a associated with NIP LAN site, e.g., site 200a, and through a PVC pipe (represented by ATM cloud 105) to a second ATM BPX switch 275b associated with remote NIP LAN site, e.g., site 200b, to a router 290 at the remote site via an OC3 connection and finally to the remote RS 292 via the GIGAswitch 250 at the remote site as depicted in FIG. 3(e). As will be appreciated by skilled artisans, messages are contained within the FDDI ring 217 via the token matching mechanism with each station on the ring receiving the passed token with each message. If the token does not match that station's token, the token/message is passed on to the next station. Once the token matches the station token address, the IP address of the message is matched to an IP port address.

As further shown in FIG. 2, messages destined for the PFR 247 are typically provisioning and support data flows. The PFR 247 consists of the FDDI hubs and the GIGAswitches 250a,b, which together form the logical FDDI ring. That is, the GIGAswitches are a logical extension of the FDDI ring and provide for the configuration and monitoring of the GeoLAN FDDI hubs. As deduced from FIG. 2, example message flows involving the PFR 247 may include: TS 204 to SS 230 (PFR) multicast; ATS 205 to SS (PFR) multicast; from varied systems to an ADP 235 (PFR and GIGAswitch); from varied systems to the ACP 240 (PFR and GIGAswitch); HP Openview Manager server 248 (PFR and GIGAswitch) from network devices; NM On-site 266 from ADP 235 and BEDS-FEDS (local is GIGAswitch only); IP VPB (local is GIGAswitch only) which is a separate box for the Intelligent Peripheral; SS 230 to RS 292 (local is GIGAswitch only); BEDS to TS/ATS (PFR and GIGAswitch); MCSS to FEDS; FEDS to FEDS; and, the ADP 235 to a Network Manager Remote (NMR).

As the majority of the traffic from outside of the PFR 247 is expected on the cross WAN, SS to RS data transfer, e.g., which is approximately 7 Mb every minute, with a less than 4 second delivery window, the network design of the invention is sized for three such transactions simultaneously. The same applies to message flow out of the PFR. With respect to provisioning and support data message flows within the PFR ring 247, these messages typically include, but are not limited to: flows between the TS and SS (PFR); ATS to SS (PFR); from varied systems to the ADP (via PFR and GIGAswitch); from varied systems to ACP (via PFR and GIGAswitch); HP Openview server (via PFR and GIGAswitch); NM On-site; BEDS-FEDS (local is GIGAswitch only); IP VPB (local is GIGAswitch only); SS to RS (local is GIGAswitch only); and BEDS to TS/ATS (via PFR and GIGAswitch).

As mentioned above, the PFR 247 is physically split between GeoLAN hubs 260a and GIGAwitches 250. This split of the PFR into GeoLAN hubs 260a and GIGAwitches 250 allows the ring to carry more traffic than a traditional FDDI ring. The GIGAswitches add more FDDI ports to the ring, without additional ring latency increases. Adding new subnets or LAN segments off of the GIGAswitches do not necessarily require the routers.

According to the invention, optimization is provided for the routers in accordance with NetFlow™ which is a Cisco Systems Inc. proprietary extension to IOS 11.2. NetFlow runs on a Versatile Interface Processor (VIP) 2 card and offloads routing CPU demands from the Routing Switch Processor (RSP) of the 7513 router. According to NetFlow, the mode of operation, once enabled on an interface, is: 1) the first packet in a message flow arrives at the VIP; 2) This first packet is routed via the RSP, and the routing information is cached on the VIP; and, 3) subsequent packets in the flow are switched by the VIP directly. It should be understood that if there are a very limited number of VIP card to VIP card transactions Netflow may not be used in the standard router configuration for the NIP of the invention.

According to the invention, the NIP is logically configured to meet Real-Time call processing traffic (e.g., CS-TS), ATS-GDS traffic, and provisioning traffic requirements. Real-Time call processing traffic, ATS-GDS traffic and provisioning traffic each have differing latency requirements. In order to meet these differing requirements, the invention employs subnets to logically separate the traffic types within the LAN and WAN, as desired. Each subnet enables the assignment of specific traffic types to specific interfaces on network devices. These interfaces are to be optimized in various ways (e.g., using NetFlow). Additionally, segregated traffic may be directed to specific PVCs in the ATM WAN cloud 105 (FIG. 1), with each PVC further configured using priority rate queuing in the BPX. These optimizing configurations enables the tuning of the NIP LAN/WAN to deliver specific traffic types in the most mission efficient manner.

Given a Class B for the LAN_1 of, e.g., XX.YYY.0.0, Class C addresses were assigned for the NIP sites, using a subnet mask of 255.255.255.0, for example, for each class C address, with the exception of the PVCs, which use a subnet mask of 255.255.255.252. Thus, the subnet design and IP addressing for the LAN_1 is illustrated by Table 1 as follows:

TABLE 1

LAN_1 Subnet Design IP Addressing

| IP No. | Subnet Address | Hosts From | Hosts To | Broadcast Address |
|---|---|---|---|---|
| 1 | XX.YYY.1.0 | XX.YYY.1.1 | XX.YYY.1.254 | XX.YYY.1.255 |
| 2 | XX.YYY.2.0 | XX.YYY.2.1 | XX.YYY.2.254 | XX.YYY.2.255 |
| 3 | XX.YYY.3.0 | XX.YYY.3.1 | XX.YYY.3.254 | XX.YYY.3.255 |
| 4 | XX.YYY.4.0 | XX.YYY.4.1 | XX.YYY.4.254 | XX.YYY.4.255 |

TABLE 1-continued

LAN_1 Subnet Design IP Addressing

| IP No. | Subnet Address | Hosts From | Hosts To | Broadcast Address |
|---|---|---|---|---|
| 7 | XX.YYY.5.0 | XX.YYY.5.1 | XX.YYY.5.254 | XX.YYY.5.255 |
| 8 | XX.YYY.6.0 | XX.YYY.6.1 | XX.YYY.6.254 | XX.YYY.6.255 |

Likewise, the subnet design and IP addressing for the LAN_2 is illustrated by Table 2 as follows:

TABLE 2

LAN_2 Subnet Design IP Addressing

| IP No. | Subnet Address | Hosts From | Hosts To | Broadcast Address |
|---|---|---|---|---|
| 1 | XX.YYY.11.0 | XX.YYY.11.1 | XX.YYY.11.254 | XX.YYY.11.255 |
| 2 | XX.YYY.12.0 | XX.YYY.12.1 | XX.YYY.12.254 | XX.YYY.12.255 |
| 3 | XX.YYY.13.0 | XX.YYY.13.1 | XX.YYY.13.254 | XX.YYY.13.255 |
| 4 | XX.YYY.14.0 | XX.YYY.14.1 | XX.YYY.14.254 | XX.YYY.14.255 |
| 7 | XX.YYY.15.0 | XX.YYY.15.1 | XX.YYY.15.254 | XX.YYY.15.255 |
| 8 | XX.YYY.16.0 | XX.YYY.16.1 | XX.YYY.16.254 | XX.YYY.16.255 |

Likewise, the subnet design and IP addressing for the LAN_3 is illustrated by Table 3 as follows:

TABLE 3

LAN_3 Subnet Design IP Addressing

| IP No. | Subnet Address | Hosts From | Hosts To | Broadcast Address |
|---|---|---|---|---|
| 1 | XX.YYY.21.0 | XX.YYY.21.1 | XX.YYY.31.254 | XX.YYY.31.255 |
| 2 | XX.YYY.22.0 | XX.YYY.22.1 | XX.YYY.32.254 | XX.YYY.32.255 |
| 3 | XX.YYY.23.0 | XX.YYY.23.1 | XX.YYY.33.254 | XX.YYY.33.255 |
| 4 | XX.YYY.24.0 | XX.YYY.24.1 | XX.YYY.34.254 | XX.YYY.34.255 |
| 7 | XX.YYY.25.0 | XX.YYY.25.1 | XX.YYY.35.254 | XX.YYY.35.255 |
| 8 | XX.YYY.26.0 | XX.YYY.26.1 | XX.YYY.36.254 | XX.YYY.36.255 |

According to the invention, the mission traffic profiles include the following, but are not limited to: real-time call processing (e.g., CS-TS traffic), ATS-GDS traffic, provisioning traffic, and even a dedicated subnet for SS-RS traffic. The creation of the PVCs for the WAN also necessitates the allocation of another subnet. As shown in FIG. 2, each subnet (indicated by the number in the left column) is allocated a mission, detailed below.

TABLE 4

Subnet Missions

| IP No. | Subnet Mission |
|---|---|
| 1 | Real-Time Call Processing Traffic |
| 2 | ATS-GDS Real-Time Call Processing Traffic |
| 3 | Provisioning Traffic (this will consist of three separate entire class C addresses, and is not an actual subnet of the three previously defined class C addresses) |
| 4 | SS-RS Traffic |
| 5 | WAN Primary Link PVCs (out of the XX.YYY.ZZ.0 address space) |

TABLE 4-continued

Subnet Missions

| IP No. | Subnet Mission |
|---|---|
| 6 | WAN Secondary Link PVC (out of the XX.YYY.ZZ+1.0 address space) |
| 7 | Allocated as a separate set of Class C addresses for the IP |
| 8 | Allocated for IP Ethernet Management Rail |

According to the preferred embodiment of the invention, the PVCs for the ATM WAN fall in the following categories: real-time call processing (ATS-GDS), provisioning traffic and SS-RS data transfers. Traffic which does not explicitly fall into a given category defaults to the provisioning PVC. The priority rate queuing figures for the real-time and provisioning traffic may be derived in accordance with conventional techniques known to skilled artisans. For example, the SS-RS traffic may be given the full bandwidth of an E-3 link (34 Mbps link) to facilitate the data transfer and meet the application's timing requirements.

A more detailed description of the NIP LAN/WAN device configurations is described hereinbelow with reference to Appendices A–I. As provided in the Appendices, the following unique naming convention in the form of "ssttnnii" is provided for each interface with: "ss" indicating the NIP LAN site code having values Site__1, Site__2, and Site__3, for example; "tt" representing the type identifier having values, for example, including "cs" (communications server), "ts" (transaction server), "at" (advanced transaction server), "gd" (global data server), "ss" (statistics server), "rs" (report server), "rt" (router), "gs" (GIGAswitch), "fh" (FDDI Hub), "bd" (BEDS), "fd" (FEDS), "fw" (firewall), "oc" (overload control server), "ad" (alarm distribution processor), "vp" (voice box peripheral), etc.; "nn" representing the instance identifier having values according to the number of devices provided at the respective site; and, "ii" representing the subnet interface.

Appendix A specifically provides network addressing (IP addresses and port assignments) tables for each of the three NIP LAN sites 200*a*, 200*b*, 200*c*, labeled Site__1, Site__2, Site__3 respectively, according to the invention. Multiple IP addresses are assigned to the same port. These IP addresses are on different subnets, and avoid requiring traffic contained on one FDDI ring to traverse the router.

Appendix B specifically provides a PVC network addressing assignment table for each of the three NIP LAN sites 200*a*, 200*b*, 200*c*, labeled Site__1, Site__2, Site__3 respectively, and specifically describes the virtual channel identifier (VCI) and the associated IP address on one side of the ATM cloud 105 (primary) and backup ATM cloud 105*b* (secondary), and its distant VCI connection and associated IP address on the other side of the ATM cloud 105 (primary) and backup ATM cloud 105*b* (secondary) for each enumerated PVC. In the configuration of the invention, it is assumed that each PVC is assigned a virtual path identifier. Additionally, The BPX PVCs match those in the router, as required. The preferred speeds for the BPX PVC links for each subnet are given according to the Table 5 as follows:

TABLE 5

| BPX PVC speeds | | |
|---|---|---|
| Subnet | Minimum Speed | Maximum Speed |
| Subnet 2, real-time ATS-GDS | 5 Mbps | 10 Mbps |
| Subnet 1/3, real-time and provisioning | 64 Kbps | 24 Mbps |
| Subnet 4, SS-RS transfers | 128 Kbps | 24 Mbps |

The preferred configuration of each router 290 (e.g., Cisco No. 7513) is now described in greater detail below with an example router start-up configuration provided in Appendix C. According to the invention, the router at each site must enable each interconnected NIP LAN to retain assigned subnetwork addresses and must be equipped to accommodate the following interfaces: a Versatile Interface Processor ($\overline{\text{vip}}$ 2-40) for subnets s3,s4; a $\overline{\text{vip}}$ 2-40 for subnet s2; an OC-3 ATM private WAN link; $\overline{\text{rsp1}}$; $\overline{\text{rsp2}}$; an OC-3 ATM link; a $\overline{\text{vip}}$ 2-40 for subnet s1; and a $\overline{\text{vip}}$ 2-40 for voice IP. It should be understood that besides the Cisco 7513 implementation, any equivalent router may be implemented as long as it may be configured to provide these interfaces. The provision of the OC-3 link between the router 290 and a BPX switch in the ATM WAN enables utilization of the full 155 Mbps available bandwidth between the router and the switch and places the WAN traffic shaping on the BPX switch.

Appendix C illustrates an example start-up configuration data/parameters for the router 290 of NIP Site__1 (FIG. 2). Skilled artisans may similarly provide start-up configuration for the routers 290 at each of the other sites according to the router start-up configuration of Site__1 provided in Appendix C. As shown in Appendix C, the first number of lines specifies conventional data, including, for example, the version of the configuration data, the host name for the router (i.e., Site__1__rt); the assignment of a system password, etc. The next set of inputs specifies the configuration data/parameters for the router slots with a first configuration specifying the 7513 router slot 2 as interfacing with the CPFR 217 (FIG. 2). However, it should be understood that this may be an open connection. The next set of inputs specifies the configuration data/parameters for the 7513 router slot 3 as interfacing with the CPFR 217 of the Site__1 LAN (as shown in FIG. 2) and is associated with the IP address XX.YYY.3.2 when implementing a net mask of 255.255.255.0 for masking out the network and node addresses from the full IP address. A specification for a secondary IP address of XX.YYY.4.2 is additionally given. According to this configuration, the sending of redirect messages is disabled; the fast switching packets back out the interface on which they arrived is enabled; and, the keepalive timer for the interface is disabled. The next set of configuration data for the slot 3 of router 290 includes: for subnet 3, standby timers for configuring the time for declaration of an active or standby router to be declared down (according to Cisco's HSR protocol); standby priority for prioritizing a potential Hot Standby router; a standby preempt for indicating that, when the router has a Hot Standby priority higher than the current active router, the router will attempt to assume control as the active router; the standby IP parameter for the slot specifying an IP address XX.YYY.3.1 for the Hot Standby Router interface; and, a standby track parameter for configuring the interface so that the Hot Standby priority changes based on the availability of other interfaces, having an interface type of atm5, and an interface priority. Like parameters for the subnet 4 (group), are additionally indicated in Appendix C for the slot 3 router interface to the CPFR 217. The next set of configuration data/parameters are directed to the Cisco 7513 router slot 4 for interfacing with the CPFR 217 of the Site__1 LAN (as shown in FIG. 2) and is associated with the IP address XX.YYY.2.2 (subnet 2) when implementing a net mask of 255.255.255.0.

The next set of configuration data/parameters are directed to the configuration of the Cisco 7513 router slot 5 (OC-3 ATM) connection for interfacing with the BPX switch in the private ATM network 105. For this configuration a point-to-point sub-interface is established for communication between Site__1 and Site__2 across subnet 1 and 3 (primary). The configuration data/parameters include: associated IP address XX.YYY.ZZ.5 when implementing a net mask of 255.255.255.252; a configuring a specific PVC having parameters such as ATM PVC # (indicated as PVC connection 1), an associated VPI, VCI, adaptation layer (AAL) and encapsulation type (Logical Link Control/Subnetwork Access Protocol (LLC/SNAP)); a parameter for specifying the cost of sending a packet on an interface; a parameter for specifying the interval between hello packets sent on the interface (according to the HSR protocol); and, a parameter for setting the bandwidth value for the interface. A further set of configuration data/parameters are directed to the establishment of ATM PVC connections labeled 2–6 associated with ATM slot 5, for enabling(point-to-point) communication between the following: Site__1 and Site__2 across subnet 2 primary (ATM PVC 2); Site_1 and Site_2 across subnet 4 primary (ATM PVC 3); Site_1 and Site_3 across subnets 1 and 3 primary (ATM PVC 4); Site_1 and Site_2 across subnet 2 primary (ATM PVC 5); and, Site_1 and Site_2 across subnet 4 primary (ATM PVC 6).

The next set of configuration data/parameters are directed to configuration of the Cisco 7513 router slot 8 (OC-3 ATM) connection for interfacing with the BPX switch in the ATM network 105. For this configuration a point-to-point sub-interface is established for communication between the Site_1 LAN and Site_2 LAN across subnet 1 and 3 (secondary). The configuration data/parameters include: associated IP address XX.YYY.ZZ.129 when implementing a net mask of 255.255.255.252; a configuring a specific PVC having parameters such as ATM PVC # (indicated as PVC connection 7), VPI, VCI, adaptation layer (AAL) and encapsulation type (Logical Link Control/Subnetwork Access Protocol (LLC/SNAP)); a parameter for specifying the cost of sending a packet on an interface; a parameter for specifying the interval between hello packets sent on the interface (according to the HSR protocol); and, a parameter for setting the bandwidth value for the interface. A further set of configuration data/parameters are directed to the establishment of ATM PVC connections labeled 8–12 associated with ATM slot 8, for (point-to-point) communication according to the following: Site_1 and Site_2 across subnet 2 secondary (ATM PVC 2); Site_1 and Site_2 across subnet 4 secondary (ATM PVC 3); Site_1 and Site_3 across subnets 1 and 3 secondary (ATM PVC 4); Site_1 and Site_2 across subnet 2 secondary (ATM PVC 5); and, Site_1 and Site_2 across subnet 4 secondary (ATM PVC 6).

The next set of inputs specifies the configuration data/parameters for the 7513 router slot 9 as interfacing with the CPFR 217 of the Site_1 LAN (as shown in FIG. 2) and is associated with the IP address XX.YYY.1.2 when implementing a net mask of 255.255.255.0. The configuration data then disables the sending of redirect messages; enables the fast switching packets back out the interface on which they arrived; and, disables the keepalive timer for the interface.

The next set of inputs specifies the configuration data/parameters for the 7513 router slot 10 as interfacing with the Intelligent Peripheral FDDI (not shown) associated with the Site_1 LAN (of FIG. 2) and is associated with the IP address XX.YYY.5.2 when implementing a net mask of 255.255.255.0.

Next, the Enhanced Interior Gateway Routing Protocol (EIGRP) routing process is established using the router EIGRP global configuration command including an integer parameter (3) for identifying the routes to the other EIGRP routers. There is additionally configured the established the following passive-interfaces, such that routing updates are disabled: (CPFR 217) interface slot 9 (subnet 1); (ATM PVC) interface slot 5 (subnet 2); and (CPFR 217) interface slot 3 (subnet 3 and 4).

Next, the Enhanced Interior Gateway Routing Protocol (EIGRP) routing process is established including an integer parameter (4) for identifying the routes to the other EIGRP routers. There is additionally configured the established the following passive-interfaces, such that routing updates are disabled: (CPFR 217) interface slot 9 (subnet 1); (ATM PVC) interface slot 8 (subnet 2); (ATM PVC) interface slot 5 (subnet 3 and 4); and (CPFR 217) interface slot 3 (subnet 3 and 4).

Next, the OSPF routing process is configured with a process-id identification parameter for an OSPF routing process.

Finally, as shown in Appendix C, the static IP host name-to-address mapping in the host cache is configured. For instance, the following mappings are provided: IP Host Site_1 router 1 to address XX.YYY.1.3; IP Host Site_2 router 1 to address XX.YYY.ZZ.9; IP Host Site_2 router 2 to address XX.YYY.ZZ.137; etc.

The preferred configuration for each GIGAswitch 250 provided at each NIP site is now described in greater detail below with reference to Appendix D. As described, there are two GIGAswitches per site, e.g., Site_1gs01, Site_1gs02, and each table in appendix D illustrates the preferred GIGAswitch slot, port, destination connection (distant end), distant end device slot/port, and mission configuration for each of the GIGAswitches 250. It is assumed that two GIGAswitches are of a 24-port configuration with twenty (20) ports per switch for adjacent systems, and four ports for use in inter-switch hunt groups. When feasible, and, in order to contribute to the resiliency built into the NIP LAN/WAN configuration, multiple GIGAswitch ports with the same mission do not share slots. This is to ensure that a mission will not be lost in the event a server is taken down. Thus, for example, a GIGAswitch connection with the mission (link) to BEDS (subnet 3) is provided at slot 6, port 3, in addition to slot 9, port 2.

As mentioned, all GeoLAN configurations are dual-homed from each server with each set of servers being split between cards within each GeoLAN hub. The preferred GeoLAN configuration provided at each NIP site is now described in greater detail below with reference to Appendix E. As described, there are two GeoLAN hubs per FDDI ring (CPFR and PFR), per site, and referred to in Appendix E as Site_1fh01-Site_1fh04, for example, with each table illustrating the preferred GeoLAN Hub slot, port, destination connection (distant end device) and distant end device slot/port, and subnet mission configuration. Skilled artisans may similarly configure each GeoLAN hub for the remaining sites (Site_2, Site_3) according to the configurations provided for Site_1.

In the preferred embodiment, subnet 2 (and some portion of subnet 1) is configured to provide ATS-GDS Real-Time Call Processing Traffic according to the Reliable Datagram Protocol (RDP2). Appendix F provides the mapping of the composite RDP Node Name to the Interface Name for each of the NIP sites, in addition to, mapping of the composite RDP Service Name to Node Name and port.

Each NIP LAN Site 200 is configured to allocate 10 Mbps of bandwidth for the ATS-remote GDS call traffic across the WAN. The host system's default gateways are defined to ensure that this bandwidth is used only by ATS-remote GDS traffic (See FIG. 3(*e*)). The default gateway on IP systems is used for communications to any system which is not on a local subnet. Systems which are on local subnets receive packets directly over that subnet. All call processing systems which have an interface on the provisioning ring (subnet IP3) use the Cisco 7513 IP3 interface as their default gateway, including the ATS. All systems which do not have this second interface, will have an IP1 address, and use the Cisco 7513 IP1 interface as their default gateway, including the GDS. Since there is no real-time WAN traffic traversing IP1, this ensures that these systems route non-critical traffic over IP1 in the LAN. The ATS-remote GDS traffic is directed down the correct path by host routing table entries on these systems, which specify the Cisco 7513 IP2 interface as the gateway between them. Appendix G provides the host routing table for the Site_1 router 290. Skilled artisans may similarly configure each Host Routing Table routers 290 at the remaining sites (Site_2, Site_3) according to the configurations provided for Site_1.

FIGS. 4(a)–4(l) illustrate the application traceability matrix for each network device at a site, and particularly, the preferred mapping of the unique interfaces provided at all the network devices at a site, e.g., Site_1 of FIG. 2, with the application according to the "ssttnnii" naming convention described herein. Included in the mappings provided in FIGS. 4(a)–4(l), are the required addresses and interface names, e.g., Site_1ts01 representing the Site_1 transaction server 01 and Site_1rt0101 representing the Site_1 router 01 subnet 1, a field describing the purpose of the interface, a field describing the protocols on the interface, and a field describing the assigned subnet address space for that network device. The provision of an asterisk "*" in the figures indicates that the interface carries reduced Transaction Capabilities Application Part (TCAP) with Intelligent Network Application Part (INAP). As known, TCAP enables the deployment of advanced intelligent network services by supporting non-circuit related information exchange between signaling points using a Signaling Connection Control Part (SCCP) connectionless service. For example, calling card calls are also validated using TCAP query and response messages. INAP has been developed by the ITU and is a parallel definition of intelligent network (IN) standards based on the American AIN 0.1.

Referring to FIG. 4(a) there is illustrated the CS server application traceability matrix 310 for Site_1 (see FIG. 2); FIG. 4(b) illustrates the TS server application traceability matrix 320 for Site_1; FIGS. 4(c)(1) and 4(c)(2) illustrate the ATS server application traceability matrix 330 for Site_1; FIG. 4(d) illustrates the GDS server application traceability matrix 340 for Site_1; FIG. 4(e) illustrates the OCS server application traceability matrix 350 for Site_1; FIG. 4(f) illustrates the SS server application traceability matrix 360 for Site_1; FIG. 4(g) illustrates the RS server application traceability matrix 370 for Site_1; FIG. 4(h) illustrates the BEDS server application traceability matrix 380 for Site_1; FIG. 4(i) illustrates the FEDS server application traceability matrix 390 for Site_2; FIG. 4(j) illustrates the ACP server application traceability matrix 410 for Site_1; FIGS. 4(k)(1) and 4(k)(2) illustrate the ADP server application traceability matrix 420 for Site_1; FIG. 4(l) illustrates the OVW (HP Open View) server application traceability matrix 410 for Site_1. Although not shown, skilled artisans may similarly provide such an interface mapping to the applications for each of the other sites according to the configuration provided in FIGS. 4(a)–4(l).

A novel benchmark testing methodology as described in detail in commonly-owned, co-pending U.S. patent application Ser. No. 09/877,890 the contents, drawings and disclosure of which is incorporated by reference as if fully set forth herein, proves out the performance benefits, resiliency and redundancy designed into the NIP LAN/WAN of the invention. Functionally, the benchmark configuration and test described in co-pending U.S. patent application Ser. No. 09/877,890 describes how the LAN/WAN design of the invention successfully segments the various traffic types, both within the LAN, and across the WAN. Further, it has been demonstrated that performance of the real-time traffic, including the cross WAN ATS-GDS traffic, is unaffected by provisioning and statistics traffic. Real time packet latencies (all latencies are measured as round-trip) across the WAN are proven to be approximately in the 1.6 ms range, regardless of other WAN traffic levels. This does not include WAN propagation delays which measure in the 10–14 ms range on the NIP production sites. Without traffic segregation afforded by the network topology of the invention, real-time packet latencies may increase above 7 seconds when the links are subject to heavy loads.

The foregoing merely illustrates the principles of the present invention. Those skilled in the art will be able to devise various modifications, which although not explicitly described or shown herein, embody the principles of the invention and are thus within its spirit and scope.

What is claimed is:

1. A system for implementing a call processing application across a plurality of local area network (LAN) sites interconnected via a wide area network (WAN), with each LAN site comprising:
    (a) first high-speed network including one or more interconnected network elements for handling call processing traffic, each said network element of said first network having an associated internet protocol IP address;
    (b) second high-speed network including one or more interconnected network elements for handling call provisioning traffic, each said network element of said second network having an associated internet protocol IP address, said associated IP addresses of said first and second high-speed networks being logically segregated into one or more subnets for handling call traffic according to traffic latency requirements; and,
    (c) a router device configured to interface with each said first and second high-speed networks at a site via said one or more subnets and enable traversal of call processing and provisioning traffic over said WAN destined from one LAN site to another of said LAN sites, whereby network traffic latencies are minimized by routing different network traffic types via said one or more subnets.

2. The system as claimed in claim 1, wherein said WAN comprises an ATM network including one or more permanent virtual circuits (PVCs) for routing traffic over said WAN, each said one or more PVCs configured for interconnecting a router device at each said site and having an assigned IP address associated with a particular subnet, whereby network traffic of a particular type is routed across a WAN in accordance with its logical subnet.

3. The system as claimed in claim 2, wherein, at each site, each said first and second high speed networks implementing a fiber distributed data interface ring (FDDI) configured for redundancy.

4. The system as claimed in claim 3, wherein a network element of said first high-speed network includes one or more communicating server (CS) devices for receiving information relating to processing a received call event, and one or more transaction server (TS) devices for brokering call requests for call routing information, said CS and TS devices having interface addresses assigned to a first logical subnet address space.

5. The system as claimed in claim 4, wherein a network element of said first high-speed network includes one or more advanced transaction server (ATS) devices for providing additional call routing information for received call events, said ATS devices having interface addresses assigned to a second logical subnet address space, wherein call processing traffic between said ATS and TS devices is communicated over said first redundant high-speed network.

6. The system as claimed in claim 5, wherein an IP/Reliable Datagram Protocol (RDP) is established for communication to network elements assigned to said second logical subnet address space.

7. The system as claimed in claim 6, wherein network elements of said first high speed network includes one or more global data server (GDS) devices for receiving call routing information, said one or more global data sever (GDS) devices having interface addresses associated with said first and second logical subnet address space.

8. The system as claimed in claim 4, further including IP provisioning links to said FDDI device of said second high-speed network, said FDDI device of said second high-speed network assigned interface addresses associated with a third logical subnet.

9. The system as claimed in claim 8, further including one or more statistics server (SS) devices for collecting call statistics from said TS and ATS server devices, wherein call provisioning traffic between said TS and SS devices is communicated over said IP links associated with said third logical subnet.

10. The system as claimed in claim 4, wherein a network element includes one or more alarm distribution processor (ADP) devices for distributing alarm messages in said network, each said ADP device assigned interface addresses associated with said third logical subnet.

11. The system as claimed in claim 7, further including one or more communication links between said first high-speed network to said router device, wherein traffic destined for traversal to another site across said WAN is communicated over a first communication link associated with said first logical subnet addresses and over a second communication link associated with said second logical subnet addresses.

12. The system as claimed in claim 11, wherein network traffic provided from a first LAN site and destined for a GDS server device at another said LAN site is communicated via a PVC over said ATM network for receipt by a router device at said another site, and communicated to said GDS over second communication links.

13. The system as claimed in claim 4, further including intelligent peripheral call control server device, wherein traffic destined to an ATS from said call control server device is routed via said router across a fourth logical subnet for communicating intelligent peripheral type call processing traffic.

14. The system as claimed in claim 9, wherein a network element of said second high-speed network includes a GIGAswitch switching device having port assignments associated with said third logical subnet address space for communicating network traffic said FDDI device of said second high speed network.

15. The system as claimed in claim 4, wherein network elements of said second high speed network device includes overload control server (OCS) device having assigned interface addresses associated with said third logical subnet, said system further including IP communication interface between said OCS and said FDDI network device.

16. The system as claimed in claim 14, wherein a network element includes a report server device for generating reports pertaining to call processing, said system further including IP communication links assigned to said second logical subnet addresses.

17. The system as claimed in claim 1, further including ATM switching device for connection to said router via a PVC, said ATM switching device enabling traffic shaping of network according to specified quality of service parameters.

18. A method for partitioning call processing applications across multiple local area network (LAN) sites interconnected by a wide area network (WAN), said method comprising:

(a) assigning an associated internet protocol IP address to each network element of a first high-speed network for handling call processing traffic at a LAN site;

(b) assigning an associated internet protocol IP address to each network element of a second high-speed network for handling call provisioning traffic at a LAN site;

(c) logically segregating said associated IP addresses of said first and second high-speed network elements into one or more subnets for handling all call traffic and provisioning traffic according to traffic latency requirements; and (d) configuring a router device to interface with each said first and second high-speed networks at a site via said one or more subnets for enabling call processing and provisioning traffic to traverse said WAN from one LAN site to another LAN site, whereby network traffic latencies are minimized by routing different network traffic types via said one or more subnets.

19. The method as claimed in claim 18, wherein said WAN comprises an ATM network including one or more permanent virtual circuits (PVCs) for routing traffic over said WAN, the method including configuring each said one or more PVCs for interconnecting a router device at each said site and assigning IP address associated with a particular subnet, whereby network traffic of a particular type is routed across a WAN in accordance with its logical subnet.

20. The method as claimed in claim 19, wherein, at each site, each said first and second high speed networks implements a fiber distributed data interface ring (FDDI) configured for redundancy.

21. The method as claimed in claim 20, further including the steps of receiving call processing events requesting call routing information and brokering said call processing requests among network elements having interface addresses assigned to a first logical subnet address space.

22. The system as claimed in claim 21, further including providing additional call routing information for received call events from network elements having interface addresses assigned to a second logical subnet address space.

23. The method as claimed in claim 22, further including establishing an IP/Reliable Datagram Protocol (RDP) for communication to network elements belonging to said second logical subnet address space.

24. The method as claimed in claim 22, further establishing IP provisioning links to said FDDI device of said second high-speed network, and assigning ports of said FDDI device interface addresses associated with a third logical subnet.

25. The method as claimed in claim 24, further including the step of collecting call statistics information from said network elements and communicating said call statistics information over said IP links associated with said third logical subnet.

26. The method as claimed in claim 25, further including the step of distributing alarm messages at said network site and communicating said alarm messages over said IP links associated with said third logical subnet.

* * * * *